(12) United States Patent
Stirtz

(10) Patent No.: US 8,413,367 B1
(45) Date of Patent: Apr. 9, 2013

(54) TROLLING DODGER

(76) Inventor: Ronald H. Stirtz, Creswell, OR (US)

( * ) Notice: Subject to any disclaimer, the term of this patent is extended or adjusted under 35 U.S.C. 154(b) by 810 days.

(21) Appl. No.: 12/589,044

(22) Filed: Oct. 16, 2009

(51) Int. Cl.
*A01K 91/00* (2006.01)

(52) U.S. Cl.
USPC .......................................... 43/43.13

(58) Field of Classification Search .................. 43/43.13, 43/42.31
See application file for complete search history.

(56) References Cited

U.S. PATENT DOCUMENTS

| | | | | |
|---|---|---|---|---|
| 2,726,475 A | * | 12/1955 | Wiselka | 43/43.13 |
| 3,056,228 A | * | 10/1962 | Stackhouse | 43/42.51 |
| 3,230,658 A | * | 1/1966 | Wuotila | 43/42.23 |
| 4,201,006 A | * | 5/1980 | Wetherald | 43/42.06 |
| 5,829,184 A | * | 11/1998 | Studanski | 43/43.13 |
| 6,279,260 B1 | * | 8/2001 | Farr et al. | 43/43.12 |
| 6,493,984 B1 | * | 12/2002 | Bechhold | 43/43.13 |
| 7,216,456 B2 | * | 5/2007 | Kaariainen et al. | 43/42.5 |
| 2006/0174535 A1 | * | 8/2006 | Beer et al. | 43/42.31 |
| 2008/0155883 A1 | * | 7/2008 | Corbitt | 43/42.28 |

* cited by examiner

*Primary Examiner* — Christopher P Ellis
(74) *Attorney, Agent, or Firm* — Robert E. Howard

(57) ABSTRACT

A dodger type type trolling attractor which imparts a start and stop motion to a lure or bait attached thereto during trolling. The dodger has a starboard side edge, a port side edge, a blunt leading edge, a rounded trailing edge, and a longitudinal centerline. A concave portion is located adjacent the trailing edge. A plurality of leading attachment openings are located adjacent the leading edge on the starboard side and port side of said longitudinal centerline, the leading attachment openings adapted to be attached to the outer end of a fishing line. A trailing attachment opening is located adjacent the trailing edge and is adapted to be attached to the outer end of a trailing leader line attached to a lure or bated hook. A mechanism to generate periodic noise during trolling is located adjacent the trailing edge.

9 Claims, 4 Drawing Sheets

TROLLING DODGER

BACKGROUND OF THE INVENTION

The present invention relates to an improved dodger used for trolling for fish.

Trolling attractors have been used by fishermen for some time to increase their catch. A typical prior art set up is shown in FIG. 1. A main fishing line 102 extends from a rod and reel (not shown), the line being attached to the front of a lead weight 104. A short length of heavy leader 106 is attached to the rear of the lead weight 104 and to the front of an attractor ("flasher") 110. A lighter trailing leader 112 is attached at its leading end to the rear of the attractor 110 and at its trailing end to a baited hook or lure 114.

Attractors are of two basic types: flashers and dodgers. In both cases their function is to reflect light and attract fish, but their actions are fundamentally different.

Nearly all flasher type attractors, such as that shown in FIG. 1, are comprised of a sturdy spine, made of hard wire or woven wire, to which are attached a plurality of devises. Blades are attached to the devises and revolve around the spine during trolling. Flasher type attractors typically proceed along a straight path and at a constant speed through the water. Such flashers typically impart no significant action to the lure.

U.S. Pat. No. 7,216,456 describes a flasher type attractor which imparts an action to the flasher itself, but not to the lure. The flasher type attractor described in U.S. Pat. No. 7,216,456 has no spine; the main line is attached directly to one of several openings in the front of the single blade and the trailing leader attached to the rear. The flasher type attractor described in U.S. Pat. No. 7,216,456 imparts a barrel-like rotating motion to the flasher, the path of the flasher being similar to the stripe on a barber pole or candy cane.

FIG. 2 depicts the motion of the flasher of U.S. Pat. No. 7,216,456 during trolling. The flasher 210 is towed by a leader 206, and is a attached to a trailing leader 212 which tows a lure or baited hook 214. The flasher 210 has a barrel-like rotation, moving along spiral path P210 in the direction of the arrow PB (path of the towing boat), from a first outer position where the flasher is designated as 210 to a second outer position where the flasher is designated as 210'. See also FIG. 8B. The lure 214 moves through the water at a substantially constant velocity and along a substantially straight path.

Prior art dodger type attractors do not rotate. Their motion is a wig-wag, arc-like motion back and forth across the straight path of the main fishing line. FIG. 3 shows the motion of a typical prior art dodger 310 being towed by a leader 306 and attached to a trailing leader 312 which tows a lure or baited hook 314. The dodger moves back and forth from a first outer position where the dodger is designated as 310 to a second outer position where the dodger is designated as 310'. The path of motion P310 of the trailing leader attached to the rear of the dodger is sinusoidal, i.e., a series of esses (see FIG. 8C), and the lure 314 attached to the trailing leader 312 is always moving forward through the water at a substantially constant velocity and along a substantially straight path. The only lure action that can be achieved with the traditional dodger is one of repeatedly turning the lure slightly left, then slightly right, and this slight action only occurs when using a very short trailing leader which most fishermen do not like.

SUMMARY OF THE INVENTION

It is an object of the present invention to provide a dodger type attractor that imparts a start-stop action to an attached lure or baited hook during trolling.

The dodger of the present invention has a starboard side, a port side, a substantially blunt leading edge, a rounded trailing edge, and a longitudinal centerline extending there between.

A plurality of leading attachment openings are located adjacent the leading edge of the dodger on the starboard side and port side of the longitudinal centerline of the dodger, the openings adapted to be attached to the outer end of a fishing line. The starboard side leading attachment openings are adapted to be attached to fishing lines located on the starboard side of the boat, and the port side leading attachment openings are adapted to be attached to fishing lines located on the port side of the boat A trailing attachment opening is located adjacent the trailing edge along the longitudinal centerline, and is adapted to be attached to a trailing leader.

A slot is located adjacent the trailing edge in a mid-portion thereof, and a noise producing member is slidably located within the slot in a manner adapted to allow the noise producing member to slide back and forth within the slot during changes in motion of the dodger and generate a noise when it comes into abutment with the ends of the slot.

The dodger of the present invention widens the trolling path beyond that of prior art devices, and allows a choice of how wide the path will be. The dodger allows two fishermen to fish from the same side of the boat and not have their lines interfere with each other.

DESCRIPTION OF PREFERRED EMBODIMENTS

Figure 1:
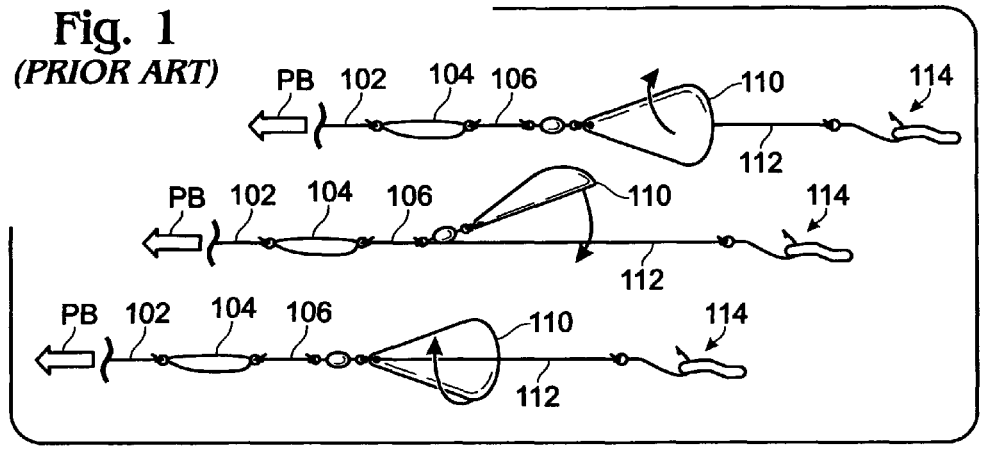
FIG. 1 is a schematic top view of a typical trolling set up using a flasher type attractor which rotates about the towing axis during trolling.

The dodger 10 of the present invention is a substantially rectangular, elongated, thin body member having substantially parallel right (starboard) and left (port) side edges 12 and 14, respectively. Dodger 10 has an angular leading end 16 and a rounded trailing end 18. Angular leading end 16 is comprised of two substantially straight legs, starboard side leg 17 and port side leg 17', which intersect at center line CL. The angle between legs 17, 17' is preferably greater than about 90 degrees and less than about 180 degrees, and most preferably about 130 degrees.

The area adjacent the trailing edge 18 of dodger 10 has a concave spoon-shaped depression 22. The word "concave" is used relative to the upper surface of dodger 10.

The forward portion 20 of dodger 10 located between said leading edge and said concave depression 22 is substantially flat, i.e., the planes of the upper and lower surfaces of dodger 10 are substantially parallel to each other.

A centerline CL divides dodger 10 into two substantially equal parts which are substantially mirror images of each other.

Although not intended to be limiting, dodger 10 is preferably about 5.75 inches long, about 2.0 inches wide, and about $\frac{1}{32}$ inch thick.

Leading starboard side attachment openings 23 and 24 are located on the leading end of dodger 10 adjacent starboard side leg 17 of leading edge 16, and leading port side attachment openings 23' and 24' are located on the leading end of dodger 10 adjacent port side leg 17' of leading edge 16. Leading starboard side attachment opening 24 is located adjacent side edge 12 and leading starboard side attachment opening 23 is located between attachment opening 24 and the centerline CL of dodger 10. Leading port side attachment opening 24' is located adjacent side edge 12 and leading port side attachment opening 23' is located between attachment opening 24' and the centerline CL of dodger 10.

Leading attachment openings 23, 23', 24 and 24' are positioned to assist in causing the lure or bait attached to the dodger to start and stop during trolling Trailing attachment opening 26 is centrally located on the trailing end of dodger 10 adjacent trailing end 18.

A slot 30 having a starboard end 32 and a port end 32' is located on the trailing end of dodger 10 adjacent trailing end 18, its mid-portion being located substantially on centerline CL. A noise making member 34 is located within slot 30 and is adapted to slide back and forth along slot 30 and into abutment with the ends 32, 32' to thereby generate a noise. Slot 30 is preferably straight, but can be curved.

Leading starboard side attachment openings 23 and 24, and port side attachment openings 23' and 24' are adapted to receive and be connected to the outer end of a fishing line by any means commonly used in the art to effect such a connection. Likewise, trailing attachment opening 26 is adapted to receive and be attached to the leading end of a trailing lure leader line by any means commonly used in the art to effect such a connection. A lure or baited hook is attached to the trailing end of trailing leader line in any manner known in the art.

Figure 7:
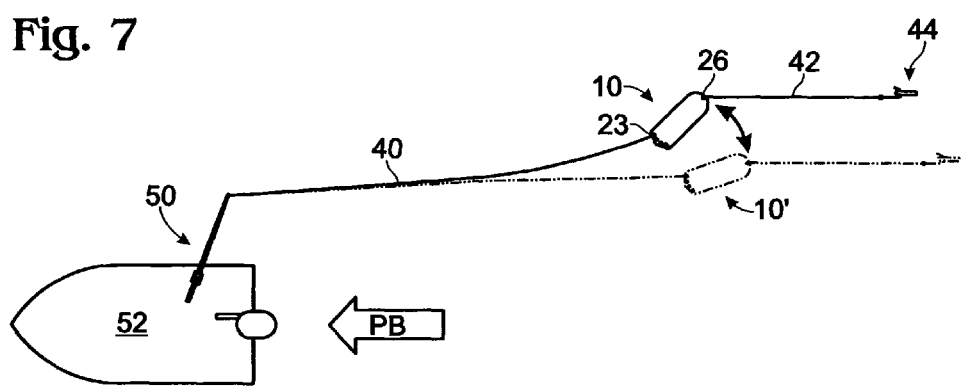
FIG. 7 is a top view of the dodger of the present invention depicting its motion during trolling.
Figure 9:
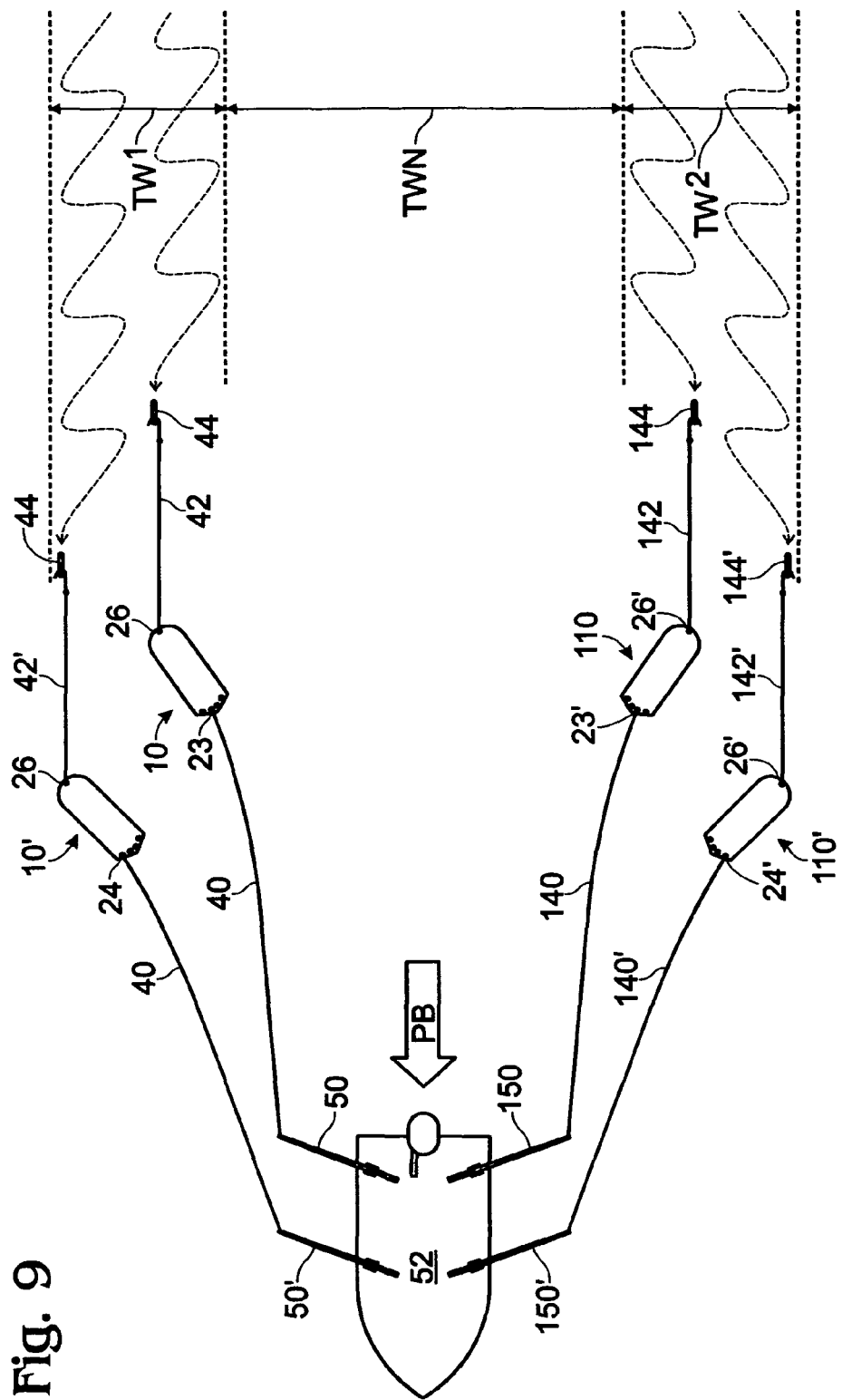
FIG. 9 is a top view of a boat showing line placement where there are two lines out from each side of the boat that are attached to the dodger of the present invention.

FIG. 7 shows a dodger 10 connected to a fishing line 40 via leading starboard attachment opening 23 where the line 40 extends from a rod and reel 50 located on the starboard side of a fishing boat 52 towards the stern thereof. The leading end of trailing leader line 42 is attached to the trailing attachment opening 26. A lure or baited hook 44 is attached to the trailing end of trailing leader line 42

Where it is desired to place two or more lines into the water from the same side of a fishing boat, as shown in FIG. 9, the forward most starboard line 40' would be connected to the starboard attachment opening 24 of dodger 10', which is located farthest from the centerline CL, and the rearward most starboard line would be connected to the starboard attachment opening 23 of dodger 10, which is located nearest the centerline CL. Similarly, the forward most port line 140' would be connected to the starboard attachment opening 24' of dodger 110', which is located farthest from the centerline CL, and the rearward most port line 140 would be connected to the starboard attachment opening 23' of dodger 110, which is located nearest the centerline CL. Trailing attachment openings 26 of the starboard side dodgers 10, 10' would be attached to lure attachment lines 42, 42', and trailing attachment openings 26 of the port side dodgers 110, 110' would be attached to lure attachment lines 142, 142', it being understood that dodgers 10, 10', 110, and 110' are identical to each other.

Figure 8:
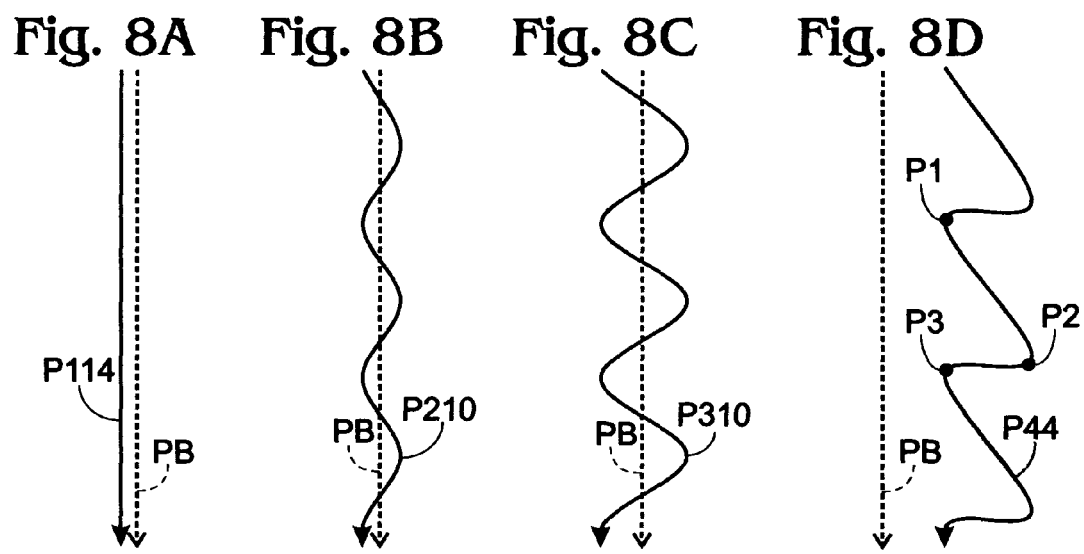
FIG. 8A is a top view of the path of the prior art flasher shown in FIG. 1.
FIG. 8B is a top view of the path of the flasher described in U.S. Pat. No. 7,216,456 and in FIG. 2.
FIG. 8C is a top view of the path of the prior art dodger shown in FIG. 3.
FIG. 8D is a top view of the path of the lure towed by the dodger of the present invention.

The stop-start motion of dodger 10 achieved during trolling is shown in FIGS. 7 and 8D. During trolling along path PB taken by boat 52, dodger 10 swings from an inner position wherein the dodger is designated "10'" to an outer position wherein the dodger is designated "10", and back to the inner position, this movement cyclically repeating itself as long as the boat 52 continues to move forward. At its inner position, the centerline CL of dodger 10' approaches being parallel to the path PB taken by boat 52. At its outer position, the centerline CL of dodger 10 approaches being perpendicular to the path PB taken by boat 52.

As dodger 10 moves from its inner position (where the dodger is designated 10') to its outer position (where the dodger is designated 10), the velocity of lure 44 is increased from a velocity substantially equal to zero to a higher velocity due to the outward movement of dodger 10. This motion of lure 44 is illustrated in FIG. 8D where the path of lure 44 is designated as "P44". Lure 44 goes from a position P1 to a position P2 where its velocity is increased from substantially zero to a higher velocity.

As dodger 10 moves from its outer position 10 to its inner position 10', leader line 42 relaxes and the velocity of lure 44 is decreased from a higher velocity to a velocity substantially equal to zero due to the inward/rearward movement of dodger 10. This motion of lure 44 is illustrated in FIG. 8D where lure 44 goes from a position along the path P44 between point P1 and point P2 where it has a higher velocity due to its forward motion to a position along the path P44 between point P2 and point P3 where the forward velocity of lure 44 is substantially zero.

Thus, during trolling the dodger 10 imparts a start-stop action to the motion of the lure or baited hook 44 which is highly attractive to fish.

In addition, as dodger 10 moves from its inner position to its outer position, noise making member 34 slides from abutment with starboard end 32 of slot 30 into abutment with port end 32' of slot 30, thereby generating a noise. As dodger 10 moves from its outer position to its inner position, the process is reversed and noise making member 34 slides from abutment with port end 32' into abutment with starboard end 32 of slot 30 to generate a noise.

Figure 2:
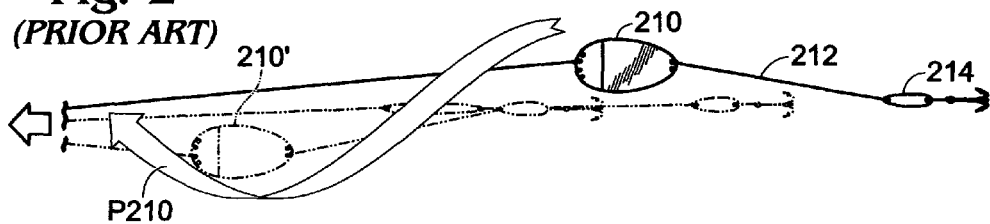
FIG. 2 is a top view of the prior art flasher described in U.S. Pat. No. 7,216,456 showing its barrel-like motion during trolling.
Figure 3:
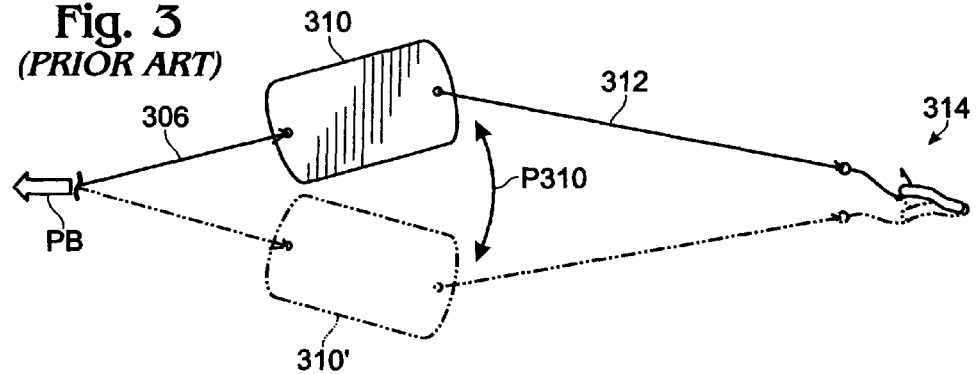
FIG. 3 is a schematic top view of a typical prior art dodger showing its wig-wag motion during trolling.
Figure 4:
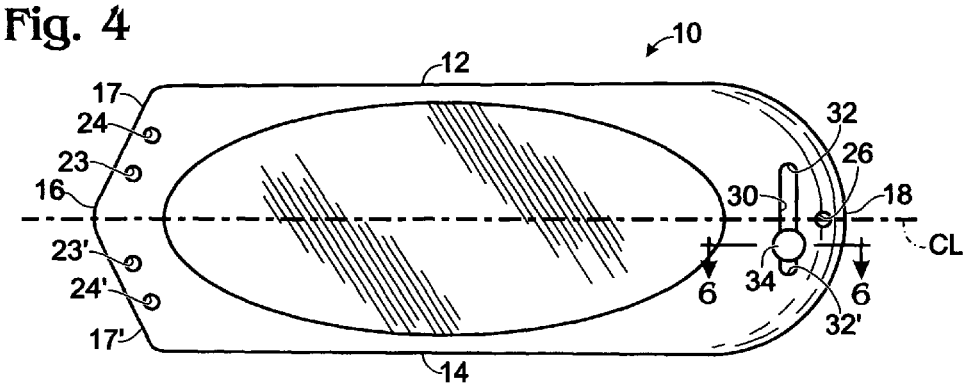
FIG. 4 is a top plan view (upper surface) of the dodger of the present invention.
Figure 5:
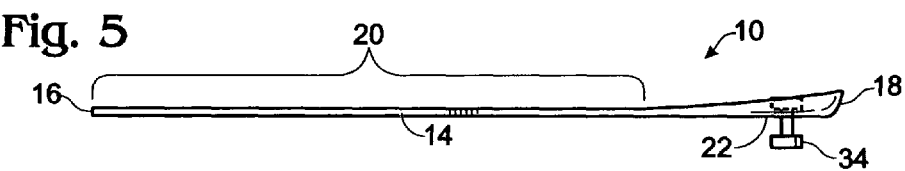
FIG. 5 is a side elevation view of the dodger of the present invention.
Figure 6:
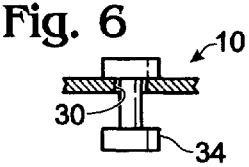
FIG. 6 is a cross-section view of the noise maker of the dodger taken along line 6-6 of FIG. 4.

The trolling motion of the of the prior art attractors described in FIGS. 1-3 are illustrated in FIGS. 8A-C, wherein the arrows PB indicate the direction of the trolling boat.

FIG. 8A represents the motion of the rear leader attachment of a typical prior art flasher 110 illustrated in FIG. 1, which is substantially a straight line with the attached lure 114 having a substantially constant velocity.

FIG. 8B represents (in two dimensions) the motion of the prior art flasher 210 described in U.S. Pat. No. 7,216,456 illustrated in FIG. 2, which is substantially a barrel-roll motion, in-and-out of the plane of the drawing, with the attached lure 214 having a substantially constant velocity.

FIG. 8C represents the motion of the rear leader attachment of a typical prior art dodger 310 illustrated in FIG. 3, which is substantially a wig-wag motion with the attached lure 314 having a substantially constant velocity.

FIG. 8D represents the motion of the rear leader attachment of the dodger 10 of the present invention, as described above.

The dodger of the present invention widens the trolling path by at least twenty feet compared to traditional dodgers, and allows a choice of how wide the path will be by leading attachment opening selection, the openings closest to the edge providing a wider swing out. This is shown in FIG. 9 wherein the distance TWN represents the width of the trolling path of prior art attractors. The distance TWN plus TW1 plus TW2 represents the total width of the trolling path using the dodgers 10, 10', 110, and 110' of the present invention.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A dodger type trolling attractor configured to impart a start-stop action to the motion of a lure or baited hook attached thereto during trolling comprising:
   an elongated dodger body having an upper surface, a lower surface, a starboard side edge, a port side edge, a leading edge, a trailing edge, and a longitudinal centerline;
   a concave spoon-shaped depression located in said upper surface of said body adjacent the trailing edge of said body; said lower surface of said body being substantially flat;
   at least two leading attachment openings located on the starboard side of said centerline and adjacent said leading edge of said body, and at least two leading attachment openings located on the port side of said centerline and adjacent said leading edge of said body, said leading attachment openings adapted to be attached to the outer end of a fishing line; and
   a centrally located trailing attachment opening located adjacent said trailing edge of said body, said trailing attachment opening adapted to be attached to the leading end of a trailing leader having a lure or baited hook attached to its trailing end.

2. The dodger of claim 1 wherein said dodger body has substantially parallel starboard and port edges, an angular leading edge, and a rounded trailing edge.

3. A dodger type trolling attractor configured to impart a start-stop action to the motion of a lure or baited hook attached thereto during trolling comprising:
   an elongated dodger body having an upper surface, a lower surface, a starboard side edge, a port side edge, a leading edge, a trailing edge, and a longitudinal centerline, said starboard side edge and said port side edge being substantially parallel;
   a concave spoon-shaped depression located in the upper surface of said body adjacent said trailing edge of said body, said lower surface of said body being substantially flat;
   a plurality of leading attachment openings located on the starboard side and port side of said centerline and adjacent said leading edge of said body, said leading attachment openings adapted to be attached to the outer end of a fishing line;
   a trailing attachment opening centrally located adjacent said trailing edge of said body, said trailing attachment opening adapted to be attached to the leading end of a trailing leader having a lure or baited hook attached to its trailing end.

4. A dodger type trolling attractor configured to impart a start-stop action to the motion of a lure or baited hook attached thereto during trolling comprising:
   an elongated dodger body having an upper surface, a lower surface, a starboard side edge, a port side edge, an angular leading edge, a trailing edge, and a longitudinal centerline, said starboard side edge and said port side edge being substantially parallel;
   said upper surface of said body having a concave depression located therein adjacent said trailing edge, said lower surface of said body being substantially flat;
   a plurality of leading attachment openings located on the starboard side and port side of said centerline and adjacent said leading edge of said body, said leading attachment openings adapted to be attached to the outer end of a fishing line; and
   a trailing attachment opening centrally located adjacent said trailing edge of said body, said trailing attachment opening adapted to be attached to the leading end of a trailing leader having a lure or baited hook attached to its trailing end.

5. The dodger of claim 4 wherein said angular leading edge is formed from a substantially straight starboard side leg extending forwardly from the forward end of said starboard side edge and a substantially straight port side leg extending forwardly from the forward end of said port side edge, said starboard side leg and said port side leg intersecting at said longitudinal centerline.

6. The dodger of claim 5 wherein said angle formed between said starboard side leg and said port side leg is between about 90 degrees and about 180 degrees.

7. The dodger of claim 6 wherein said angle is about 130 degrees.

8. The dodger of claim 4 wherein said concave depression is spoon-shaped.

9. The dodger of claim 4 wherein said longitudinal centerline divides said dodger into two substantially equal parts which are substantially mirror images of each other.

* * * * *